US011424053B1

(12) United States Patent
Kim et al.

(10) Patent No.: US 11,424,053 B1
(45) Date of Patent: Aug. 23, 2022

(54) CERAMIC FEEDTHROUGH ASSEMBLIES FOR ELECTRONIC DEVICES WITH METAL HOUSINGS

(71) Applicant: Kyocera International, Inc., San Diego, CA (US)

(72) Inventors: Franklin Kim, San Diego, CA (US); Mark Eblen, Temecula, CA (US); Hiroshi Makino, San Diego, CA (US); Shinichi Hira, San Diego, CA (US)

(73) Assignee: Kyocera International, Inc., San Diego, CA (US)

( * ) Notice: Subject to any disclaimer, the term of this patent is extended or adjusted under 35 U.S.C. 154(b) by 0 days.

(21) Appl. No.: 17/236,269

(22) Filed: Apr. 21, 2021

(51) Int. Cl.
*B32B 41/00* (2006.01)
*H01B 17/60* (2006.01)

(52) U.S. Cl.
CPC .................................... *H01B 17/60* (2013.01)

(58) Field of Classification Search
CPC ...................................................... H01B 17/60
USPC .................... 156/60, 64, 350, 351, 378, 379
See application file for complete search history.

(56) References Cited

U.S. PATENT DOCUMENTS

| | | | | |
|---|---|---|---|---|
| 2003/0015350 | A1* | 1/2003 | Kim | H05K 5/066 174/262 |
| 2011/0083897 | A1 | 4/2011 | Paterek et al. | |
| 2011/0102967 | A1 | 5/2011 | Munns et al. | |
| 2014/0272457 | A1 | 9/2014 | Watada | |
| 2017/0080239 | A1 | 3/2017 | Seitz et al. | |
| 2020/0381147 | A1* | 12/2020 | Hettier | H01B 17/305 |

FOREIGN PATENT DOCUMENTS

| | | |
|---|---|---|
| KR | 10-1926120 B1 | 12/2018 |

* cited by examiner

*Primary Examiner* — Michael N Orlando
*Assistant Examiner* — Joshel Rivera

(57) ABSTRACT

A ceramic feedthrough assembly has a feedthrough interface sleeve brazed to a ceramic feedthrough body and a housing interface sleeve brazed to the feedthrough interface sleeve. The housing interface sleeve is configured to be integrated within an electronic device and welded to a metal housing to form a hermetically sealed electronic device. The ceramic feedthrough has at least one embedded electrical conductor extending from a first location on the ceramic feedthrough body to a second location on the ceramic feedthrough body. The feedthrough interface sleeve is positioned around the ceramic feedthrough body between the first location and the second location and brazed to the wrap-around metallization. When the metal housing is welded to the housing interface sleeve, the ceramic feedthrough assembly facilitates connection to an electronic circuit hermetically sealed in the electronic device with the metal housing.

21 Claims, 4 Drawing Sheets

CERAMIC FEEDTHROUGH ASSEMBLIES FOR ELECTRONIC DEVICES WITH METAL HOUSINGS

FIELD

This invention generally relates to electronic devices with feedthrough assemblies, and more particularly to ceramic feedthrough assemblies for electronic devices with metal housings.

BACKGROUND

A ceramic feedthrough assembly is sometimes used to provide electrical connections to electrical components within a hermetically sealed housing or package. The ceramic feedthrough assembly may include a ceramic body having one or more embedded conductors extending between the interior and exterior of the housing such that electrical connections can be made to the conductors which are connected to electrical components sealed within the housing. In typical implementations, each of a plurality of embedded conductors is connected to a wire bonding pad on the ceramic body where a wire bond connects the wire boding pad to an electrical component within the housing. The housing is attached to the ceramic feedthrough assembly such that electrical components are hermetically sealed within the housing.

SUMMARY

A ceramic feedthrough assembly has a feedthrough interface sleeve brazed to a ceramic feedthrough body and a housing interface sleeve brazed to the feedthrough interface sleeve. The housing interface sleeve is configured to be integrated within an electronic device and welded to a metal housing to form a hermetically sealed electronic device. The ceramic feedthrough has at least one embedded electrical conductor extending from a first location on the ceramic feedthrough body to a second location on the ceramic feedthrough body. The feedthrough interface sleeve is positioned around the ceramic feedthrough body between the first location and the second location and brazed to the wrap-around metallization. When the metal housing is welded to the housing interface sleeve, the ceramic feedthrough assembly facilitates connection to an electronic circuit hermetically sealed in the electronic device with the metal housing.

BRIEF DESCRIPTION OF THE DRAWINGS

It is to be understood that the drawings are solely for a purpose of illustration and do not define the limits of the invention(s). Furthermore, the components in the figures are not necessarily to scale. In the figures, like reference numerals designate corresponding parts throughout the different views.

DETAILED DESCRIPTION

Figure 1A:
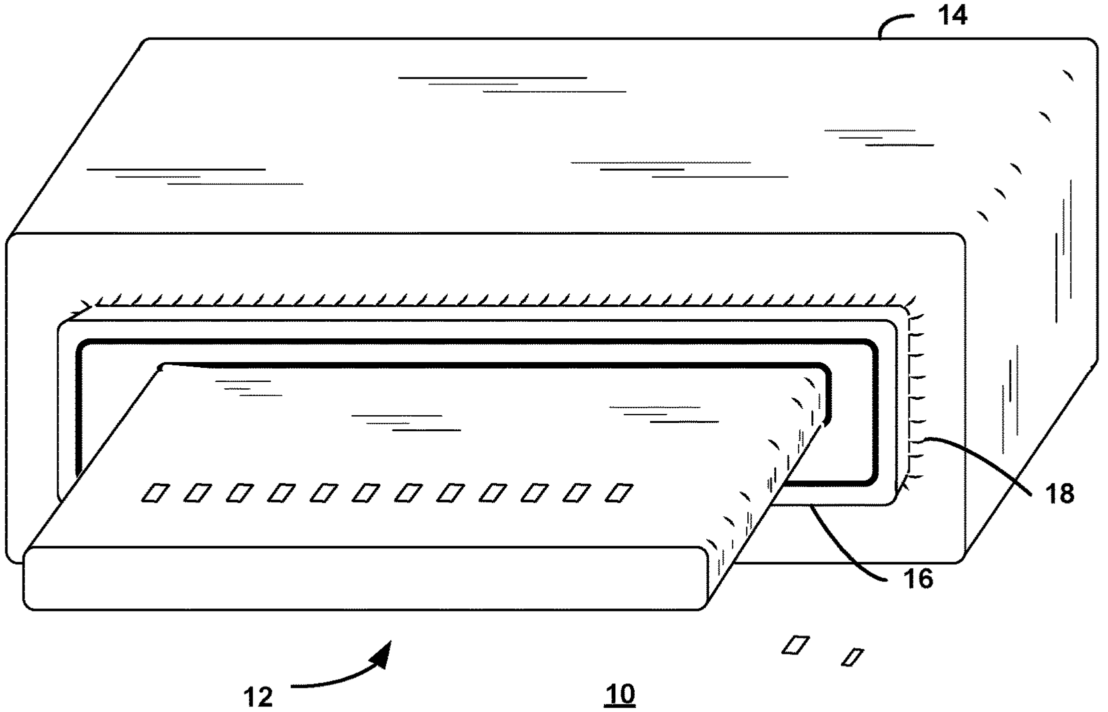
FIG. 1A is an illustration of a perspective view an example of an electronic device incorporating a ceramic feedthrough assembly.

As discussed above, ceramic feedthrough assemblies facilitate connections to electronic components within hermetically sealed housings. Conventional techniques typically include brazing the housings to the ceramic feedthrough assembly or brazing a sleeve to the ceramic feedthrough assembly in order for the metal housing to be welded to the sleeve. The housings of sleeves are typically made from nickel-cobalt ferrous (FeNiCo) alloys, an iron-nickel (FeNi) alloy or Titanium. During the brazing process and subsequent cooling, the final electronic device with a hermetically sealed housing experiences extreme environmental fluctuations where conventional techniques suffer from lower reliability as the size of the ceramic feedthrough assembly increases. More specifically, the large differential between the Coefficient of Thermal Expansion (CTE) of the alumina ceramic of the ceramic feedthrough assembly and the CTE of the housing (or sleeve) results in failures of the hermetic seal formed between the ceramic feedthrough assembly and the metal housing (or sleeve) over large temperature fluctuations. The thermal expansion mismatch between the ceramic feedthrough body and the housing (or sleeve) manifests as excessive deflection in the ceramic feedthrough body. Excessive deflection (i.e., camber) contributes to high bending (i.e., flexural) mechanical stress which may cause fractures of the feedthrough. After the housing (or sleeve) is brazed to the ceramic body and during cooling of the brazed assembly, the thermal expansion difference between the ceramic feedthrough assembly and the housing (or sleeve) may cause excessive deflection of the ceramic feedthrough assembly. The deflection results in the ceramic feedthrough assembly being more vulnerable to brittle fractures, which jeopardizes the hermetic seal and reliability of the electronic package. The problem increases with the size of the ceramic body. As the length of the ceramic feedthrough body surpasses 0.75 inches, for example, the reliability of conventional devices declines significantly.

In accordance with the techniques discussed herein, however, reliability is improved with a feedthrough interface sleeve and housing interface sleeve interposed between the ceramic body and the housing. A first sleeve (feedthrough interface sleeve) is connected to the ceramic body to form a first hermetic seal and a second sleeve (housing interface sleeve) is connected to the first sleeve. After electrical components are connected to the internal wire bond pads, a metal housing is connected to the second sleeve to form a third hermitic seal which hermetically seals the interior of the metal housing from the exterior. The material of the feedthrough interface sleeve is selected to have a CTE comparable to the CTE of the ceramic material of the ceramic body. For the examples discussed below, the first sleeve is connected to the ceramic body by brazing, the second sleeve is connected to the first sleeve by brazing, and the housing is connected to the second sleeve by welding. In some situations, different techniques may be used for connecting the first sleeve to the ceramic body, the second sleeve to the first sleeve, and/or the housing to the second sleeve. For example, high temperature solder may be used for one or more of the connections.

Failures of the hermetic seals of the final electronic device are reduced compared to conventional designs with the use of the two-sleeve structure where at least the feedthrough interface sleeve material is selected based on the CTE value of the material. Stresses on the ceramic body during the welding and cooling periods is reduced by reducing the difference between the thermal expansion of the feedthrough interface sleeve and the thermal expansion of the ceramic body. The CTE of the feedthrough interface sleeve material is selected to be closer to the CTE of the ceramic material for at least temperatures experienced during brazing of the feedthrough interface sleeve and the subsequent cooling.

FIG. 1A is an illustration of a perspective view an example of an electronic device 10 incorporating a ceramic feedthrough assembly 12. The ceramic feedthrough assembly 12 facilitates connections to electrical components within the hermetically sealed electronic device 10 after a metal housing 14 is welded to the ceramic feedthrough assembly 12. After electrical components are connected to the ceramic feedthrough assembly 12, the metal housing 14 is welded to the housing interface sleeve 16 of the ceramic feedthrough assembly 12 to form a weld 18 between the housing interface sleeve 16 and the metal housing 14.

Figure 1B:
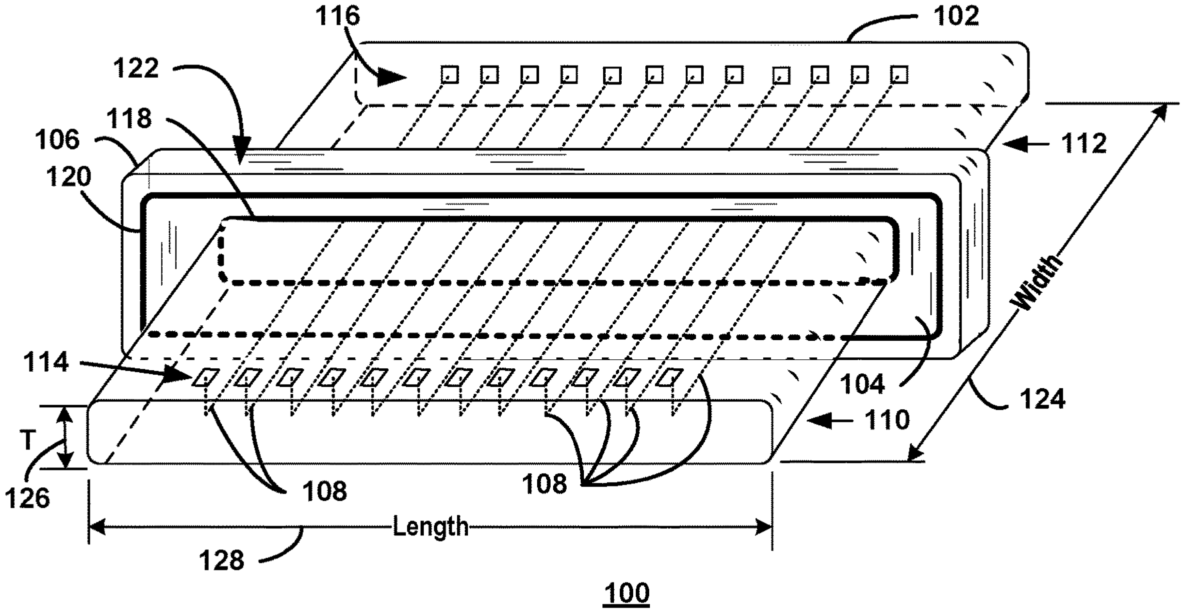
FIG. 1B is an illustration of a perspective view an example of a ceramic feedthrough assembly suitable for use in an electronic device.

FIG. 1B is an illustration of a perspective view an example of a ceramic feedthrough assembly 100 suitable for use in an electronic device. Accordingly, the ceramic feedthrough assembly 100 of FIG. 1B is an example of the ceramic feedthrough device 12 in the electronic device of FIG. 1A. The ceramic feedthrough assembly 100 includes at least a ceramic body 102, a feedthrough interface sleeve 104 and a housing interface sleeve 106. The housing interface sleeve 106 of FIG. 1B is an example of the housing interface sleeve 16 in FIG. 1A. FIG. 1A and FIG. 1B provide a general illustration of the relative positions of the components and is not necessarily to scale. Also, FIG. 1B provides an example of relative dimensions and other relative dimensions may be used based on the particular implementation. For example, the width of the ceramic body 102 may be significantly less than the length in some situations although the relative length-width dimensions in FIG. 1B are shown as comparable in the interest of clarity. Other components and features of the ceramic feedthrough assembly 100 of the example may not be shown in FIG. 1B. The illustration shows the ceramic body 102 as transparent such that some features are drawn with dashed lines.

For the example, the ceramic body 102 incudes a plurality of embedded conductors 108 that extend from a first side 110 of the ceramic body 102 to the second side 112 of the ceramic body 102 such that a plurality of electrical connector pads 114 on the first side 110 is electrically connected to a plurality of wire bond pads 116 on the second side 112. In most situations, each embedded conductor electrically connects to one electrical connector pad located on the first side 110 to one wire bond pad on the second side 112. Other arrangements and configurations, however, may be used in some circumstances. Although the ceramic feedthrough assembly 100 shown in FIG. 1B includes twelve embedded conductors, twelve wire bond pads, and twelve electrical connector pads, the ceramic feedthrough assembly may include any number of embedded conductors wire bond pads, and electrical connector pads. The ceramic feedthrough assembly includes at least one embedded conductor, one wire bond pad, and one electrical connector pad.

As discussed in further detail below, the feedthrough interface sleeve 104 is connected to the ceramic body 102 by brazing the feedthrough interface sleeve 104 to metallization (not shown in FIG. 1B) on the ceramic body 102. The resulting braze 118 between the feedthrough interface sleeve 104 and ceramic body 102 forms a first hermetic seal. The housing interface sleeve 106 is brazed to the feedthrough interface sleeve 104 where the braze 120 between the housing interface sleeve 106 and the feedthrough interface sleeve 104 forms a second hermetic seal. Although the brazing of each sleeve 104, 106 may be performed in any order including simultaneously, the feedthrough interface sleeve 104 is brazed to the ceramic body before the housing interface sleeve 106 is brazed to the feedthrough interface sleeve 104 in the example. The housing interface sleeve 106 has a welding surface 122 that is configured to facilitate welding of the metal housing 14 (not shown in FIG. 1B) to the housing interface sleeve 106. In many situations, the ceramic feedthrough assembly 100 is provided to a manufacturer that integrates the ceramic feedthrough assembly 100 with other components and the metal housing 14 to form a final hermetically sealed electronic package. In most situations, the electrical components are connected to wire bond pads 116 after the metal housing 14 is welded to the housing interface sleeve 106 at the welding surface 122 to form a third hermetic seal. Accordingly, the weld 18 (not shown in FIG. 1B) formed between metal housing 14 and the housing interface sleeve 106 forms the third hermetic seal. The feedthrough interface sleeve 104 and housing interface sleeve 106, therefore, are positioned between the connector pads 114 and the wire bond pads 116 such that, when the electronic circuit having a hermetically sealed housing is complete, the electrical connector pads 114 provide electrical connections to the circuits and components sealed within the final hermetically sealed electronic device.

For the example of FIG. 1B, the feedthrough interface sleeve 104 and housing interface sleeve 106 have a general rectangular block shape. Other shapes can be used for the sleeves 104, 106 and the sleeves may include other features. Such modified shapes and features may be useful during the assembly and manufacturing process. As discussed below with reference to FIG. 3, for example, a “stair step sleeve pattern” may be used in order to locate each sleeve in relation to the other after the feedthrough interface sleeve is aligned to the ceramic body. In addition, such sleeve features facilitate the accurate alignment of the metal housing before welding. Typically, the connector pads and the wire bond pads have distance tolerances. For example, the connecting members such as wire bonds may have a maximum length. Accordingly, locating features or shapes of the sleeves facilitate locating the sleeves accurately along the ceramic body which in turn assists the device manufacturer in aligning the feedthrough assembly correctly with the metal housing.

Although other ceramic materials may be used, examples of suitable materials of the ceramic body 102 include alumina ($Al_2O_3$) materials. In many examples, the ceramic body comprises at least 85% alumina. In one example, the ceramic body comprises between 88% and 96% alumina. In another example, the ceramic body comprises between 90% and 92% alumina. An example of a suitable material with an $Al_2O_3$ content of 92% (92% alumina) is Kyocera A473. The material of the feedthrough interface sleeve is selected, at least partially, based on the CTE of the material within a range including the brazing temperature and the ability of the material to withstand the brazing temperature. For example, silver-copper (AgCu) brazing typically requires a temperature of approximately 780° C. Tungsten-Copper (WCu) materials have a CTE very similar to alumina at least within the range of 400° C. to 800° C. The CTEs of WCu materials are similar to alumina for the cooling temperature range after brazing which is approximately 800° C. to room temperature. As discussed below in further detail, one example includes a feedthrough interface sleeve made from WCu 90/10 (where "90/10" refers to respective weight percentage) and a ceramic body 102 made from alumina where the feedthrough interface sleeve is brazed to the metallization on the ceramic body 102 with a AgCu eutectic braze. In another example, the feedthrough interface sleeve comprises Molybdenum-Copper (MoCu). Other materials can be used in accordance with the techniques discussed herein.

The ceramic body 102 has a width 124 that extends from the edge of the ceramic body on the first side 110 to the edge of the ceramic body on the second side 112. The thickness (T) 126 of the ceramic body 102 and the length 128 of the ceramic body are associated with the dimensions of the opening of the metal housing 14 to which the ceramic feedthrough assembly 100 is welded. Accordingly, the thickness 126 and length 128 dictate the size of the feedthrough interface sleeve and housing interface sleeve. As discussed above, conventional feedthrough techniques that include a single, CTE mismatched sleeve suffer from ceramic body stress fractures during temperature fluctuations. Reliability of conventional electronic packages decreases as the size of the feedthrough assembly increases. Since the thickness 126 is typically much less than the length 128, the reliability of conventional electronic devices is more directly related to the length and the reliability decreases as the length increases. The chances of a fracture increase as the length of the ceramic body approaches and surpasses 0.75 inches. Accordingly, the techniques discussed herein provide significant improved reliability as compared to conventional techniques where the ceramic body is greater than 0.75 inches. In some situations, the techniques discussed herein provide advantages and improved reliability for lengths greater than 0.5 inches. However, advantages of the CTE matched feedthrough interface sleeve techniques may be achieved with other sized ceramic bodies. For example, a feedthrough with a length of 0.33 inches may benefit from the advantages of the techniques discussed herein. Further, the techniques discussed herein may address problems not specifically discussed or may provide advantages to feedthrough arrangements, configurations, and requirements in addition to those discussed.

Figure 2A:
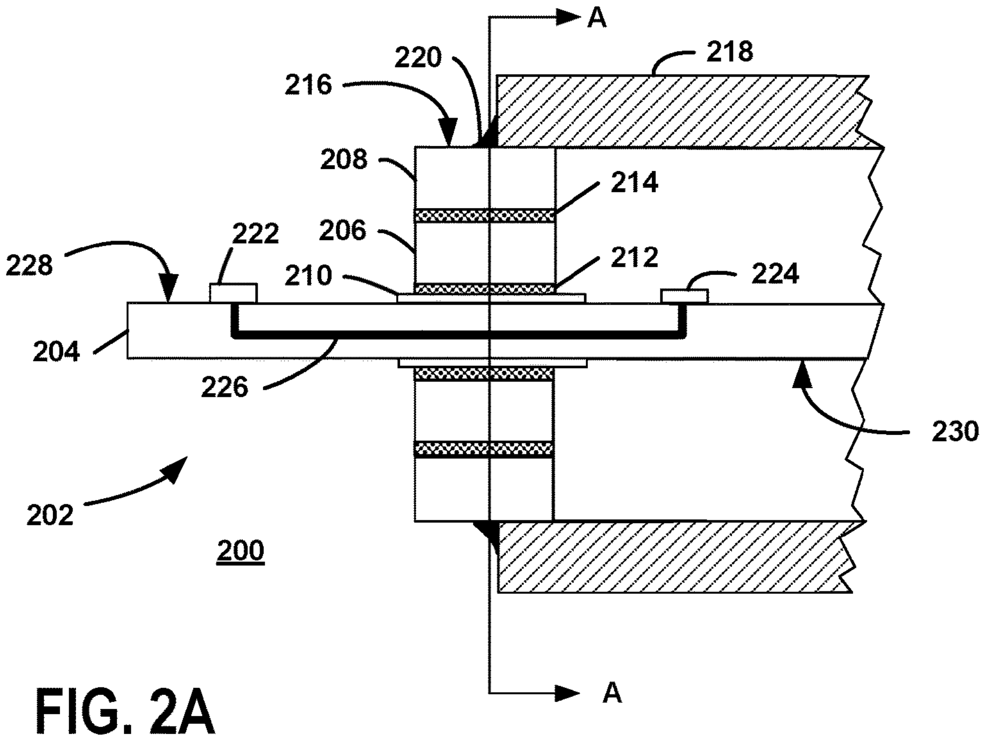
FIG. 2A is an illustration of a cross-sectional side view an example of a portion of an electronic device incorporating a ceramic feedthrough assembly having ceramic body, a feedthrough interface sleeve, and a housing interface sleeve.

FIG. 2A is an illustration of a cross-sectional side view an example of a portion of an electronic device 200 incorporating a ceramic feedthrough assembly 202 having ceramic body 204, a feedthrough interface sleeve 206, and a housing interface sleeve 208. The electronic device 200 of FIG. 2A, therefore, is an example of the electric device 10 discussed with reference to FIG. 1A. For the example of FIG. 2, the ceramic body includes wrap-around metallization 210 that provides a surface that can be brazed to the feedthrough interface sleeve 206. Although other metals can be used in some circumstances, an example of a suitable material for the wrap-around metallization 210 includes Tungsten (W). For the examples herein, the wrap-around metallization 210 including Tungsten that is high-temperature fired onto the exterior peripheral surface of the ceramic body. Examples of other suitable materials include Molybdenum (Mo) and Molybdenum-Manganese (Mo-Mm). The feedthrough interface sleeve 206 is brazed to the wrap-around metallization 210. The resulting braze 212 forms a first hermetic seal between the ceramic body 202 and the feedthrough interface sleeve 206. The housing interface sleeve 208 is brazed to the feedthrough interface sleeve 206 where the resulting braze 214 forms a second hermetic seal between the feedthrough interface sleeve 206 and the housing interface sleeve 208. The housing interface sleeve 208 includes a surface 216 that is configured to facilitate welding of a metal housing 218 to the housing interface sleeve 208. After the metal housing 218 is welded to the welding sleeve 208, the resulting weld 220 forms a third hermetic seal.

At least one electrical connection pad 222 is connected to at least one wire bond pad 224 by at least one embedded conductor 226. As discussed above the connection pads 222, embedded conductors 226 and bonding pad 224 facilitate connections to electrical components hermetically sealed within the electronic device 200 after the metal housing 218 is welded to the ceramic feedthrough assembly 202. The electrical connection pads, therefore, are positioned on a first side of the two-sleeve structure comprising the feedthrough interface sleeve and housing interface sleeve and the wire bod pads are positioned on the second side of the two-sleeve structure. As a result, the first side is on the exterior and the second side is within the interior of the finished hermetically sealed electronic device 200. For the example of FIG. 2, the wire bond pad 224 is on the same lateral surface 228 as the electrical connection pad 222. The wire bond pad 224 may be positioned in other locations on the ceramic body 102. The wire bond pad 224, for example, may be positioned on the opposite lateral surface 230 of the ceramic body 204. As shown is FIG. 1B, the wire bond pad may be on a ceramic body surface perpendicular to the surface where the connection pad is located. As discussed above, the ceramic feedthrough assembly may have several electrical connection pads, embedded conductors and wire bond pads.

In typical scenarios, the ceramic feedthrough assembly 202 is assembled and then integrated with an electronic circuit assembly. After a metal housing 218 is welded to the housing interface sleeve 208 to hermetically seal the electrical circuit within the metal housing 218, the connections are made between the wire bond pads and the electrical circuit. In some situations, a first manufacturer assembles the ceramic feedthrough assembly 202 and a second manufacturer welds the metal housing 218 to the ceramic feedthrough assembly 202 and wire bonds the circuit to the wire bond pads to form the finished hermetically sealed electronic device 200. Typically, the metal housing includes access points to the interior of the housing for wire boding after welding.

Figure 2B:
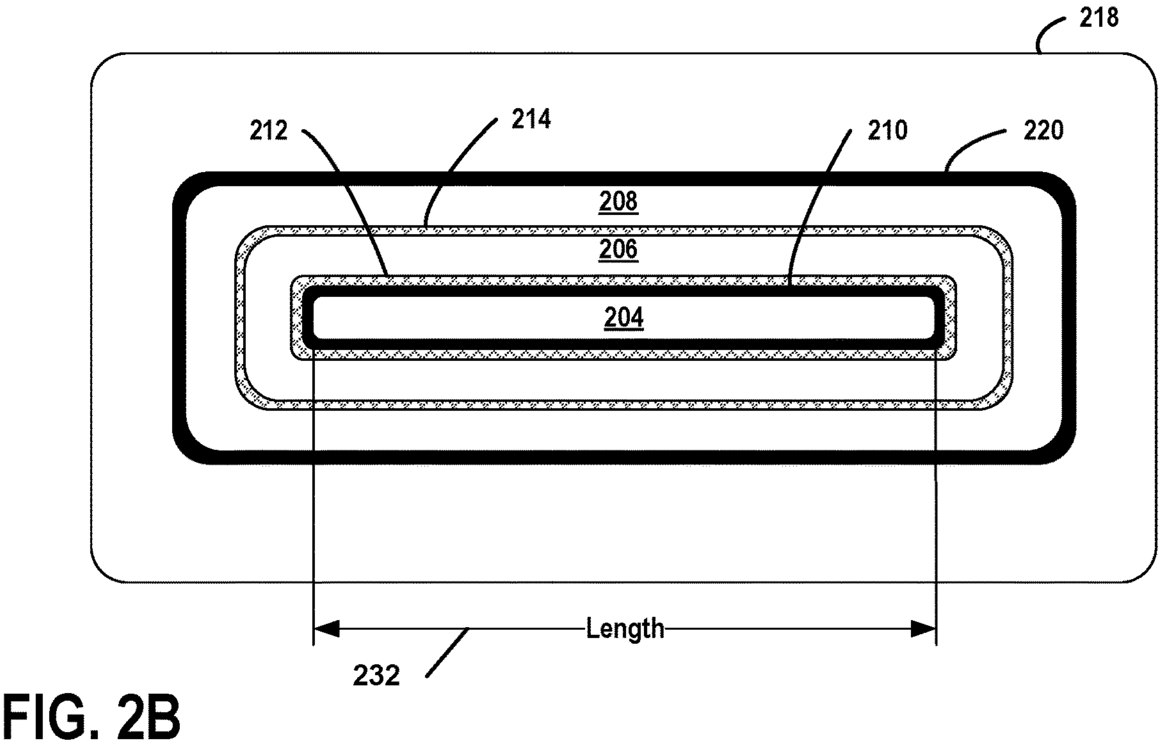
FIG. 2B is an illustration of a cross-sectional side view of the ceramic feedthrough assembly taken at line A-A in FIG. 2A.

FIG. 2B is an illustration of a cross-sectional side view of the ceramic feedthrough assembly 202 taken at line A-A in FIG. 2A. One or more components of the assembly may include chamfers or fillets at their corners to further reduce stress at these locations. For example, the ceramic body typically includes some treatment to the ceramic corners such as radius or chamfer to avoid sharp corners. The feedthrough interface sleeve includes complimentary geometry to maintain a uniform braze bond-line.

Figure 3:
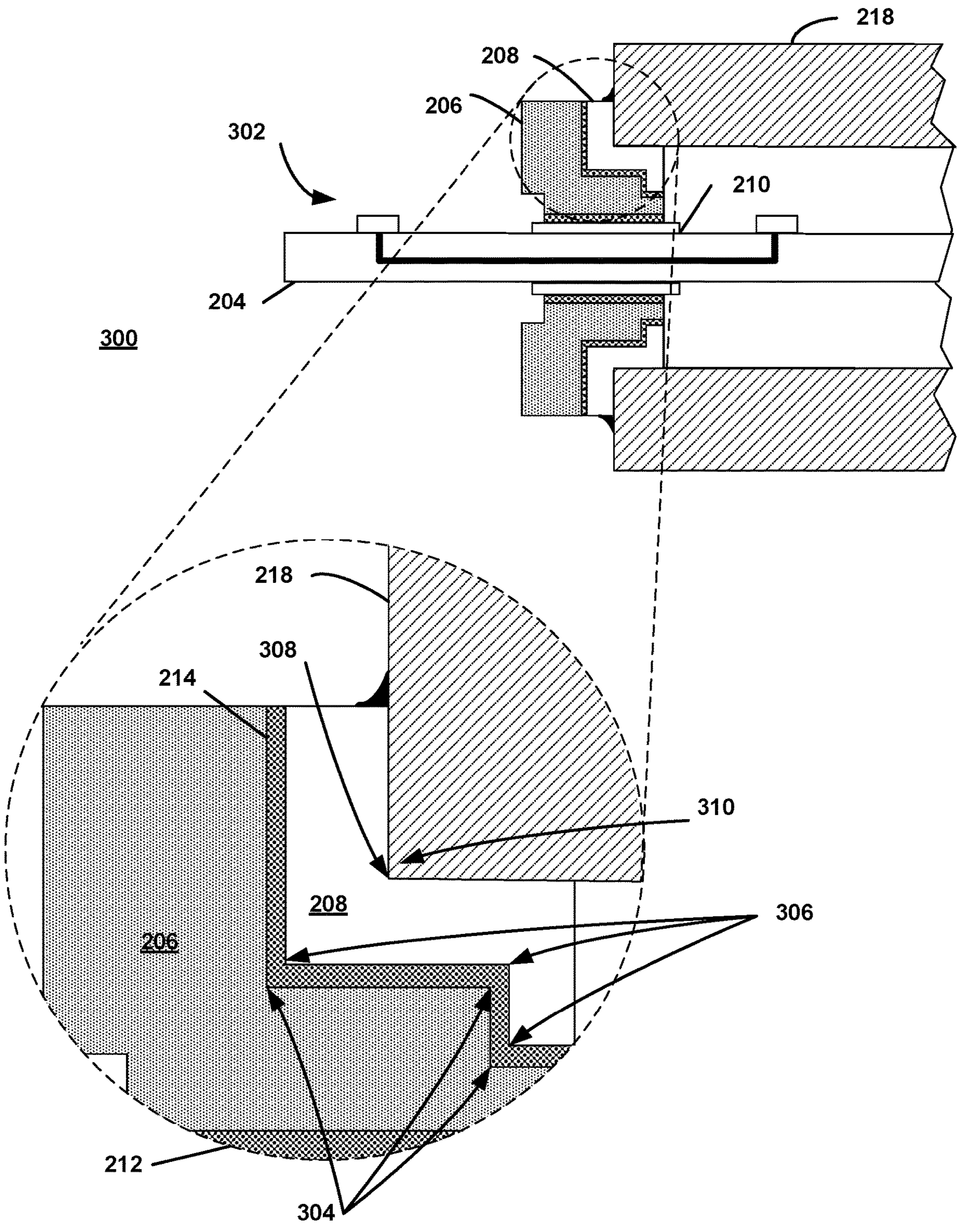
FIG. 3 is an illustration of a cross-sectional side view an example of a portion of an electronic device incorporating a ceramic feedthrough assembly having ceramic body, a feedthrough interface sleeve, and a housing interface sleeve where the feedthrough interface sleeve and housing interface sleeve include alignment features.

FIG. 3 is an illustration of a cross-sectional side view an example of a portion of an electronic device 300 incorporating a ceramic feedthrough assembly 302 having ceramic body 204, a feedthrough interface sleeve 304, and a housing interface sleeve 306 where the feedthrough interface sleeve 304 and housing interface sleeve 306 include alignment features 308, 310. The electronic device 300 of FIG. 3 is similar to the electronic device 200 of FIG. 2A except that feedthrough interface sleeve and housing interface sleeve include the alignment features. The electronic device 300 of FIG. 3, therefore, is an example of the electronic device 200 of FIG. 2A and the electric device 10 discussed with reference to FIG. 1A. Accordingly, the feedthrough interface sleeve 304 is an example of the feedthrough interface sleeve 206 and the housing interface sleeve 306 is an example of the housing interface sleeve 208.

In some circumstances, it may be advantageous to include alignment features on the feedthrough interface sleeve and/or housing interface sleeve to facilitate accurate alignment of one or more components during brazing and welding. Due to tight tolerances of wire bond lengths, for example, the position of the wire bonds pads relative to the electrical circuit must be maintained in a tight window. The position of the electrical circuit is typically dictated by the position in the housing. As a result, by aligning the ceramic feedthrough assembly to the metal housing, the wire bond pads are aligned to the electrical circuit.

The feedthrough interface sleeve 304 includes a plurality of alignment features 308 that interface face with counterpart alignment features 310 of the housing interface sleeve 306. For the example of FIG. 3, the alignment features are formed with a "stairstep" shape of the two sleeves 304, 306. Other techniques may be used to include alignment features between the two sleeves 304, 306.

The housing interface sleeve 306 includes at least one alignment features 308 that interfaces with a feature 310 of the metal housing 218. For the example of FIG. 3, the alignment feature 308 is formed with a corner shape such that a portion of the metal housing 218 is aligned with the corner and has limited movement relative to the housing interface sleeve 306 during welding. Other techniques may be used to include alignment features between the two sleeves 304, 306.

Figure 4:
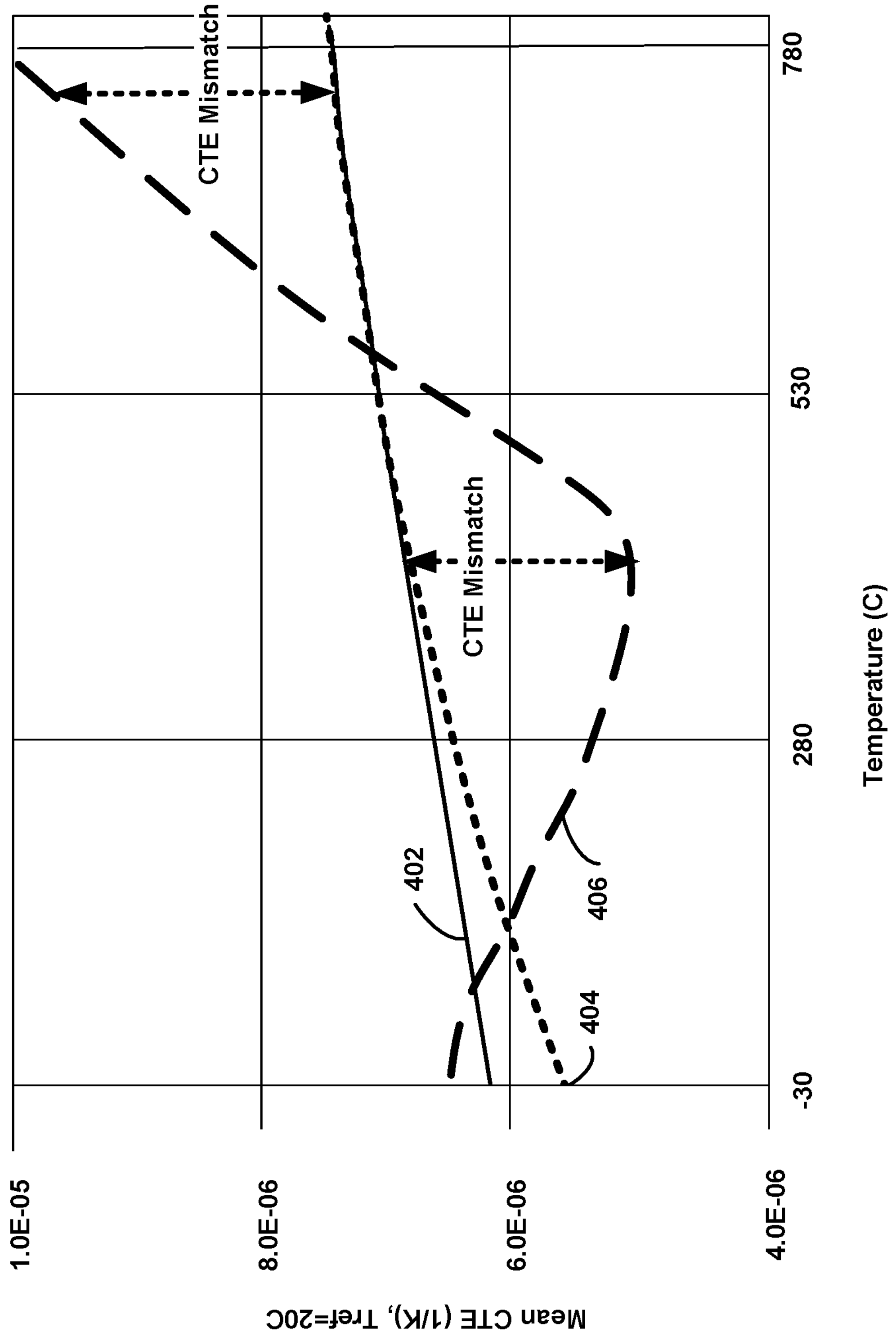
FIG. 4 is a graph comparing CTE-temperature relationship curves for examples of materials that can be used for the metal housing, ceramic body, and the feedthrough interface sleeve.

FIG. 4 is a graph comparing CTE-temperature relationship curves for examples of materials that can be used for the metal housing, ceramic body, and the feedthrough interface sleeve. Accordingly, these materials can be used in any examples discussed herein as well as other assemblies and devices implemented using the techniques discussed herein. FIG. 4 shows three curves 402, 404, 406 where each curve represents the mean CTE value over temperature for a material. For the example, the graph shows the mean CTE value over temperature for 90/10 Tungsten-Copper (90/10 WCu), alumina with an $Al_2O_3$ content of 92% (92% alumina), such as A473, and a nickel-cobalt ferrous (FeNiCo) alloy. The temperature range extends from −30° C. to 800° C. The temperature range in FIG. 4, therefore, includes the cooling range after silver-copper (AgCu) brazing which is typically from about 780° C. (or slightly greater) down to room temperature (i.e., 20° C. to 25° C.). The WCu curve 402 representing the CTE value of 90/10 WCu over the cooling temperature range in FIG. 4 is similar to the alumina 92% (A473) curve 404 representing the CTE value of alumina 92% (A473). The CTE value curves 402, 404 are nearly identical for temperatures above 400° C. with a slight mismatch of CTE value at lower temperatures. The FeNiCo alloy curve 406, however, is significantly different from the alumina 92% (A473) curve 404 where the CTE value is the same at only two temperatures values. The mismatch between the FeNiCo alloy curve 406 and the alumina 92% (A473) curve 404 is significant, especially at 400° C. and at AgCu brazing temperature of about 780° C.

As discussed above, conventional techniques include brazing a housing or sleeve made from a FeNiCo alloy to the ceramic body where the CTE mismatch between the two materials results in stress on the ceramic body during cooling. With larger sized ceramic feedthrough assemblies, the stress leads to fractures and failure. With the techniques discussed herein, however, the significantly smaller mismatch between the material (WCu) for the feedthrough interface sleeve and the material of the ceramic body minimizes the stress during cooling and maximizes the reliability of the ceramic feedthrough assembly.

In selecting the material of the feedthrough interface sleeve, the CTE-temperature curve of the feedthrough interface sleeve material is matched to the ceramic CTE-temperature curve. As discussed herein, matching curves are typically not identical but are sufficiently similar to minimize the thermal expansion differences between the two components during the cooling process after brazing.

In most situations, increased reliability of a ceramic feedthrough assembly using the two-sleeve structure compared to conventional techniques depends on the differences between the CTE-temperature curves of the ceramic, feedthrough interface sleeve and the metal housing material. Generally, improved reliability is achieved when the feedthrough interface sleeve CTE-temperature curve is better matched to the ceramic CTE-temperature curve than the metal housing material CTE curve. Stated differently, the feedthrough interface sleeve material is selected such that it has a CTE-temperature curve more closely aligned to the CTE-temperature curve of the ceramic body than the CTE-temperature curve of the material of the metal housing over a temperature range. For the examples herein, the temperature range is room temperature to the maximum expected temperature during brazing of the feedthrough interface sleeve. In some circumstances, a first CTE-temperature curve is considered to be more closely aligned with a CTE-temperature second curve than a third CTE-temperature curve where differences between the values of the first CTE-temperature curve and the values of the second CTE-temperature curve are less than the differences between the values of the third CTE-temperature curve and the values of the second CTE-temperature curve for a majority of temperatures within the range. In other circumstances, the first CTE-temperature curve is considered to be more closely aligned with the second CTE-temperature curve than the third CTE-temperature curve based on an average of differences between the curves. In still other circumstances, the comparison of the curves may be based on human interpretation of the curves. Any statistical, computational, computer-based processing curve tool, or other evaluation techniques may be used to determine whether the CTE-temperature curve of the feedthrough interface sleeve material is more closely aligned to the CTE-temperature curve than the material of the metal housing.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:

a ceramic feedthrough body having at least one embedded electrical conductor extending from a first location on the ceramic feedthrough body to a second location on the ceramic feedthrough body;

a feedthrough interface sleeve positioned around the ceramic feedthrough body between the first location and the second location and brazed to the ceramic feedthrough body to form a first hermetic seal between the feedthrough interface sleeve and the ceramic feedthrough body; and a housing interface sleeve brazed to the feedthrough interface sleeve to form a second hermetic seal between the housing interface sleeve and the feedthrough interface sleeve, the housing interface sleeve configured to be welded to a metal housing to form a third hermetic seal between the metal housing and the housing interface sleeve when welded.

2. The apparatus of claim 1, wherein the ceramic feedthrough body comprises wrap-around metallization, the feedthrough interface sleeve brazed to the wrap-around metallization.

3. The apparatus of claim 2, wherein the wrap-around metallization comprises Tungsten (W).

4. The apparatus of claim 2, wherein the feedthrough interface sleeve is brazed to the wrap-around metallization forming a braze comprising silver-copper (AgCU).

5. The apparatus of claim 1, wherein a ceramic coefficient of thermal expansion to temperature (CTE-temperature) relationship of the ceramic body is matched to the feedthrough interface sleeve CTE-temperature relationship of the feedthrough interface sleeve.

6. The apparatus of claim 5, wherein the feedthrough interface sleeve CTE-temperature relationship is sufficiently aligned with the ceramic CTE-temperature relationship to maintain the first hermetic seal at least over a brazing cooling temperature range from room temperature to a brazing temperature reached when the feedthrough interface sleeve is brazed to the ceramic body.

7. The apparatus of claim 5, wherein the feedthrough interface sleeve CTE-temperature relationship is more closely aligned with the ceramic CTE-temperature relationship than a metal housing material CTE-temperature relationship of the metal housing is aligned with the ceramic CTE-temperature relationship at least over a brazing cooling temperature range from room temperature to a brazing temperature reached when the feedthrough interface sleeve is brazed to the ceramic body.

8. The apparatus of claim 1, wherein the feedthrough interface sleeve comprises tungsten copper (WCu).

9. The apparatus of claim 1, wherein the housing interface sleeve comprises a nickel-cobalt ferrous alloy.

10. The apparatus of claim 1, wherein the feedthrough interface sleeve comprises Molybdenum-Copper (MoCu).

11. The apparatus of claim 1, further comprising the metal housing welded to the housing interface sleeve to form the third hermetic seal between the metal housing and the housing interface sleeve.

12. The apparatus of claim 1, wherein the metal housing comprises a nickel-cobalt ferrous alloy.

13. The apparatus of claim 1, wherein the feedthrough interface sleeve comprises an alignment feature configured to align the welding the sleeve to the feedthrough interface sleeve during brazing.

14. The apparatus of claim 1, wherein the housing interface sleeve comprises an alignment feature configured to align the metal housing to the housing interface sleeve during welding.

15. A ceramic feedthrough assembly for integration within an electronic device with a metal housing, the ceramic feedthrough assembly comprising:

a ceramic feedthrough body comprising:

a plurality of electric connection pads;

a plurality of wire bond pads;

a plurality of embedded electrical conductors connecting the electric connection pads to the wire bond pads; and wrap-around metallization between the plurality of electric connection pads and the plurality of wire bond pads;

a feedthrough interface sleeve positioned around the ceramic feedthrough body between the plurality of electric connection pads and the plurality of wire bond pads and brazed to wrap-around metallization of the ceramic feedthrough body to form a first hermetic seal between the feedthrough interface sleeve and the ceramic feedthrough body; and a housing interface sleeve brazed to the feedthrough interface sleeve to form a second hermetic seal between the housing interface sleeve and the feedthrough interface sleeve, the housing interface sleeve configured to be welded to a metal housing to form a third hermetic seal between the metal housing and the housing interface sleeve when welded.

16. The ceramic feedthrough assembly of claim 15, wherein a ceramic coefficient of thermal expansion to temperature (CTE-temperature) relationship of the ceramic body is matched to the feedthrough interface sleeve CTE-temperature relationship of the feedthrough interface sleeve.

17. The ceramic feedthrough assembly of claim 16, wherein the feedthrough interface sleeve CTE-temperature relationship is sufficiently aligned with the ceramic CTE-temperature relationship to maintain the first hermetic seal at least over a brazing cooling temperature range from room temperature to a brazing temperature reached when the feedthrough interface sleeve is brazed to the ceramic body.

18. The ceramic feedthrough assembly of claim 17, wherein the ceramic feedthrough body comprises alumina ($Al_2O_3$), the feedthrough interface sleeve comprises Tungsten-Copper (WCu) and the housing interface sleeve comprises a nickel-cobalt ferrous (FeNiCo) alloy.

19. The ceramic feedthrough assembly of claim 15, wherein a length of the ceramic feedthrough body at a location of the feedthrough interface sleeve is greater than 0.5 inches.

20. The ceramic feedthrough assembly of claim 19, wherein the length is greater than 0.6 inches.

21. The ceramic feedthrough assembly of claim 20, wherein the length is greater than 0.75 inches.

* * * * *